Dec. 20, 1960  C. LOWERY  2,965,014
VENT CLOSING LOUVER APPARATUS
Filed Sept. 2, 1958
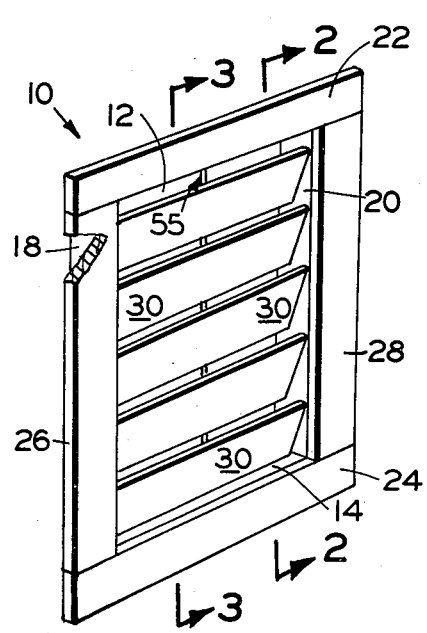
FIG. 1
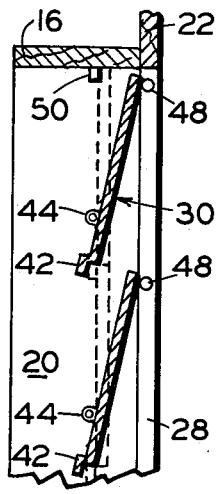
FIG. 2
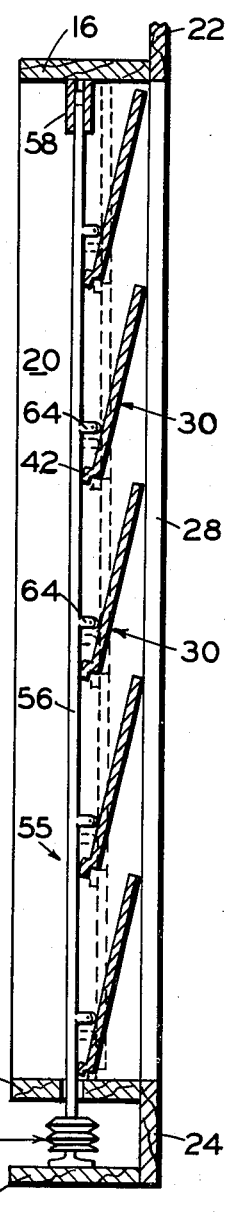
FIG. 3
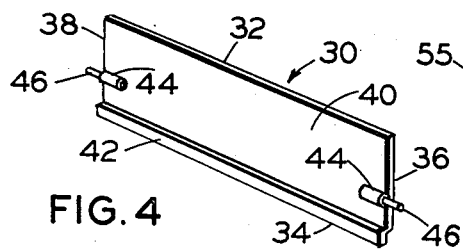
FIG. 4
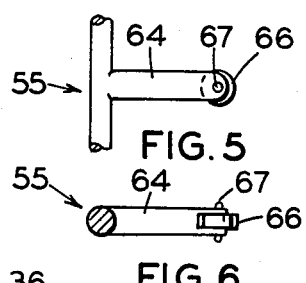
FIG. 5
FIG. 6
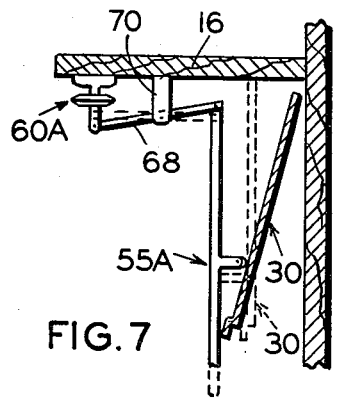
FIG. 7
Charley Lowery
INVENTOR

United States Patent Office 2,965,014
Patented Dec. 20, 1960

2,965,014

VENT CLOSING LOUVER APPARATUS

Charley Lowery, Rte. 8, Box 153, Oklahoma City, Okla.

Filed Sept. 2, 1958, Ser. No. 758,382

3 Claims. (Cl. 98—119)

The present invention relates to ventilating openings in buildings or the like and more particularly to a self closing louver means therefor.

It is conventional practice at the present to provide vents or openings in the foundations of buildings having the floor thereof elevated above the surface of the ground for the circulation of air therethrough. Similarly vents or openings are provided in the walls of dwellings having gable roofs for permitting circulation of air and thereby reducing the temperature in the attic portion during hot summer months. Such openings in the foundations are covered by screening or wire mesh while the attic vents are usually provided with fixed position louvers. During the winter months it is necessary to close the foundation vents particularly in those sections of the country where damage to plumbing or the like might result from the freezing of water in the pipes. Similarly the fixed louvers in the attic portion are designed to prevent the entry or at least the greater portion of moisture in the form of rain or snow, but since these louvers are not movable some moisture blows therethrough into the attic and the temperature within the attic soon equalizes with the temperature of the outside atmosphere thereby permitting a loss of considerable heat by convection through the ceiling of the heated rooms therebelow.

It is, therefore, the principal object of this invention to provide one or more louvers for such ventilating openings which will be pivoted from an open position to a closed position by an increase above a predetermined rate or volume of the air passing through the vent.

A similarly important object is to provide one or more louvers which may be pivotally mounted in ventilating openings of a dwelling or the like and normally maintained in an open position by gravitational attraction.

Another object is to provide a louver apparatus of this class which is further provided with lever means and a temperature responsive means for closing and maintaining the louvers in closed position in response to a decrease in the temperature of the outside atmosphere below a predetermined setting.

A further object is to provide a vent closing louver ventilating means having a temperature responsive closing means in which the louvers are pivotally mounted independently of such closing means whereby gravitational attraction normally maintains the louvers in open position and an increase in the flow of air passing between the louvers above a predetermined rate pivots the latter to a closed position.

An additional object is to provide a vent closing louver apparatus of this character which will effectively permit circulation of air therethrough and which will automatically close the vent during a wind storm or the like.

The present invention accomplishes these and other objects by providing one or more relatively thin rectangular louvers having aligned hinge means connected to its opposing ends slightly below its center of gravity. The hinge means is journaled by the opposing jambs defining a vent opening or the like and provides a horizontal axis about which each respective louver pivots when opening or closing the vent. Gravitational attraction normally maintains the louvers in open position. Lever means connected with temperature responsive means and associated with the inwardly disposed side of the louvers acts to positively pivot the louvers and close the vent in response to a decrease in the temperature of the outside atmosphere below a predetermined setting.

Other objects will be apparent from the following description when taken in conjunction with the accompanying single sheet of drawings, wherein:

Figure 1 is a perspective view of a frame enclosing a vent opening with the device of the present invention installed therein;

Figure 2 is a fragmentary vertical cross sectional view taken substantially along line 2—2 of Fig. 1;

Figure 3 is a vertical cross sectional view taken substantially along line 3—3 of Fig. 1;

Figure 4 is a perspective view of the back or inward side of one of the louvers, per se;

Figure 5 is a fragmentary elevational view of the louver contacting portion of the lever closing means;

Figure 6 is a top plan view of the portion of the lever means shown in Fig. 5; and, Figure 7 is a fragmentary vertical cross sectional view similar to Fig. 2 but illustrating a modified form of the lever closing means.

Like characters of reference designate like parts in those figures of the drawings in which they occur.

In the drawings:

Referring now more particularly to Figs. 1 to 3 the reference numeral 10 indicates, as a whole, a rectangular frame installed in the gable end of a building, not shown, defining an opening or passageway 12 for air circulation. The frame 10 includes a sill 14, a lintel 16 and opposing jambs 18 and 20. Upper and lower facing members 22 and 24, respectively, are connected to the outwardly disposed edges of the lintel 16 and sill 14, respectively, while opposing vertically disposed facing members 26 and 28, respectively are connected to the respective outwardly disposed edges of the jambs 18 and 20. Such apparatus with various modifications is conventional with the structure of most buildings wherein it is desirable to permit circulation of air through an otherwise closed area and the above described apparatus forms no part of this invention other than to set forth a structure with which the instant invention is designed to be used.

The invention, per se, comprises one or more louvers 30 each preferably formed of relatively thin metallic sheet material rectangular in general configuration and having an upper edge 32, a lower edge portion 34 and parallel opposing ends 36 and 38, respectively, as shown in the drawings. The width of the louvers 30 may be varied as desired to divide the vertical area within a particular frame or opening to be closed into sections and longitudinally the louvers are formed to extend substantially the full distance between the opposing jambs of the particular opening or frame being fitted. One side of each louver 30 is designated as the inward side as indicated by the numeral 40. The lower longitudinal edge portion of each louver is bent laterally and downwardly in offset relation with respect to the plane of the inward side 40 a distance substantially equal to the thickness of the material used to form the louvers for the purposes which will presently be apparent.

A pair of sleeve members 44 are connected to the louver side 40 in longitudinally aligned relation slightly below the center of gravity of each louver. The sleeves 44 each receive one end portion of a pair of pins 46, respectively, while the opposite end portion of each of the pins projects outwardly of the respective opposing ends of the respective louver 30. The free end portions of each of the pins are journaled by co-operatingly located sockets or apertures, not shown, in the respective jambs 18 and 20 thus forming a horizontal pivoting axis. The pins 46 are journaled by the sleeves so that gravitational attraction on the mass of each respective louver 30 causes the louver to assume an open or tilted position as shown in solid lines. Since the louvers 30 are mounted for pivotal movement about the horizontal axis formed by the sleeves 44 and pins 46 located slightly below the center of gravity of each respective louver any sudden increase in the velocity of air flowing between the louvers such as gusts of wind of an approaching storm will pivot the louvers to a closed position indicated by the dotted lines. Outward or opening movement of the louvers is limited by stops 48 contacted by the upper edge 32 of the louvers. The stops 48 are carried by one or both of the frame facing members 26 and 28. Inward pivoting movement of the louvers is limited to a vertical position by a stop 50 connected to the lowermost surface of the lintel 16 which contacts the upper inward edge portion of the topmost louver. Each succeeding or lower louver is limited in its inward pivoting to a vertical position by contiguously contacting the depending flange 42 of each preceding louver. Thus when the louvers 30 are pivoted to the vertical or closed position as by a gust of wind, they close the passageway through the frame 10 against further circulation of air therethrough. Judicious location of the sleeves 44 with respect to the center of gravity determines the velocity of air, moving against the louvers when in open position, necessary to pivot the louvers to a closed position.

Referring now more particularly to Fig. 3 a lever means 55 is illustrated in operative contact with the louvers 30. The purpose of the lever means 55 is to insure positive closing and maintaining the louvers closed in response to a decrease in the temperature of the outside atmosphere below a predetermined setting. The lever means 55 comprises a vertically disposed rod member 56 vertically secured slidably at its upper end by a sleeve or socket member 58 connected to the lintel 16 and connected at its lower end in a conventional manner to a temperature responsive thermostat 60. The rod 56 is preferably disposed inwardly of the inner surfaces 40 of the louvers a selected distance so that as gravitational attraction pivots the louvers toward the tilted open position, shown by solid lines, the lower edge portion or flange 42 will contact the rod 56 and thus act as a means for limiting the opening movement of the louvers. In the example illustrated in Fig. 3, the rod 56 extends downwardly through a suitable aperture in the sill 14 while the thermostat 60 is secured by a false sill 62. An arm 64 is perpendicularly connected with the rod 56 at selected positions therealong adjacent each respective louver 30 so that the arms 64 extend between the rod 56 and the inward side 40 of each respective louver. The free end of each arm 64 is bifurcated and provided with a small wheel or roller 66 journaled on a horizontal axis 67 (Figs. 5 and 6). It is intended that the wheels 66 shall lightly contact the respective louver 30 at a point intermediate its ends on its horizontal pivoting axis formed by the pins 46. Thus, it may be seen that each and all of the louvers 30 are free to be pivoted toward a closed position, as disclosed hereinabove, and that when the temperature falls below a predetermined setting the thermostat 60 will contract and draw the lever means 55 downwardly thereby pulling the respective arms 64 and rollers 66 downward along the inward surface 40 of the respective louvers and pivot the latter toward the closed position indicated by dotted lines. Similarly when the outside temperature has risen above the predetermined setting the thermostat 60 expands and raises the lever means 55 thus permitting the louvers to again open by gravitational attraction.

A further modification of the mounting for the lever closing means is illustrated in Fig. 7 wherein the lever means 55A is connected at its upwardly disposed end to a thermostat 60A secured to the lower surface of the lintel 16 through a lever 68 pivotally connected to the lintel by a support 70 to provide the vertical sliding movement of the lever means 55A as disclosed hereinabove for the lever means 55.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A vent closing louver apparatus, comprising: a frame having a sill, a lintel and opposing jambs; a plurality of relatively thin rectangular louvers extending horizontally between said jambs, each said louver having a depending flange laterally off-set inwardly with respect to the adjacent depending edge of the louver and said frame and adapted to nest the upper edge portion of the respective next lower said louver in overlapping relation when in closed position; outwardly projecting hinge pins connected to opposing end portions of each of said louvers in longitudinally aligned relation slightly below the center of gravity thereof and on the same side of said louvers with respect to said flanges so that the upper edge portion of each louver is normally unbalanced by gravity to pivot the louvers toward an outwardly open position, said hinge pins being journaled by the respective, adjacent said jamb whereby gravitational attraction normally maintains said louvers in open position and any sudden increase in the velocity of air flow passing inwardly through said frame overcomes the gravitational pull and tilts said louvers to a vertical closed position; and stop means carried by said jambs for limiting the opening movement of said louvers.

2. A vent closing apparatus, comprising: a frame having a sill, a lintel and opposing jambs; at least one relatively thin rectangular louver extending horizontally between said jambs; hinge means connected to opposing ends on a common side of said louver in longitudinally aligned relation slightly below its center of gravity, said hinge means each having an outwardly projecting hinge pin journaled by the adjacent said jamb forming a horizontal axis about which said louver is unbalanced whereby gravitational attraction normally maintains said louver pivoted to open position and any sudden increase in the velocity of air flow passing through said frame overcomes the gravitational pull and tilts said louver to a closed position; stop means carried by said jambs for limiting the opening pivoting movement of said louver; rod-like lever means slidably carried vertically by said sill and said lintel, said lever means having a laterally projecting, roller equipped arm in contact with the inward side of said louver at a point on a line extending between said hinge pins; and temperature responsive means connected with one end of said lever means for moving said lever means downwardly and closing said louver at a given low point of a falling temperature.

3. A vent closing louver apparatus, comprising: a frame having a sill, a lintel and opposing jambs; a plurality of rectangular louvers extending between said jambs, each said louver having a depending flange laterally off-set with respect to the adjacent depending edge of the louver and adapted to nest the upper edge portion of the respective next lower said louver in overlapping relation when in closed position; hinge means connected to each said louver slightly below its center of gravity on the common side of the louver with respect to the position of said flange and forming a horizontal axis about which each respective said louver is normally unbalanced and pivoted toward an open position by gravitational attraction and whereby a sudden increase in the rate of air flowing through said frame pivots said louvers toward a closed vertical position; a single rod slidably carried vertically by said frame adjacent the inward side of said louvers; a like plurality of horizontal arms each connected at one end to said rod in vertically spaced-apart relation, the spacing between said arms being substantially equal with respect to the width of said louvers; a roller journaled by the respective free end of each said arm in contact with the inwardly disposed side of each said louver at a point intermediate the ends thereof and on its horizontal pivoting axis when each said louver is in open position; and temperature responsive means connected to the depending end of said rod for lowering said rod and pivoting said louvers toward a closed vertical position in response to a falling temperature and maintaining said louvers in such closed position in response to a predetermined low temperature of the atmosphere, said temperature responsive means acting to raise said rod and position said rollers on the respective pivoting axis of each louver in response to a predetermined high temperature of the atmosphere.

References Cited in the file of this patent

UNITED STATES PATENTS

| | | |
|---|---|---|
| 302,215 | Tucker | July 15, 1884 |
| 1,249,731 | Fekete | Dec. 11, 1917 |
| 1,408,441 | Caldwell | Mar. 7, 1922 |
| 2,159,498 | Birkholz | May 23, 1939 |
| 2,394,059 | Hite | Feb. 5, 1946 |
| 2,698,570 | Feinberg | Jan. 4, 1955 |
| 2,790,373 | Hess | Apr. 30, 1957 |

FOREIGN PATENTS

| | | |
|---|---|---|
| 172,648 | Switzerland | Jan. 2, 1935 |